Nov. 4, 1969   F. C. COLLISTER   3,476,007
KEY BOLT
Filed Sept. 9, 1968   2 Sheets-Sheet 1
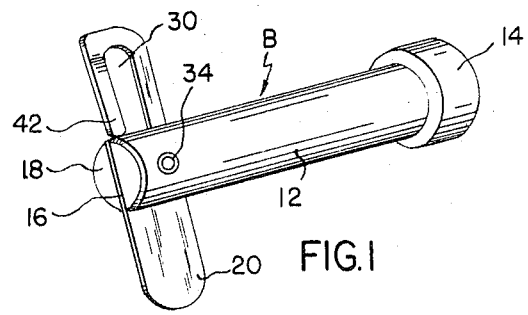
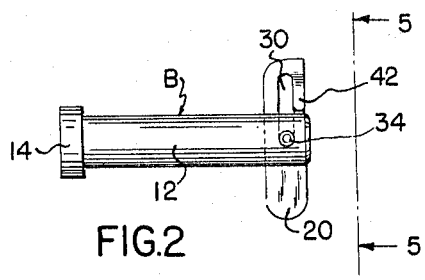
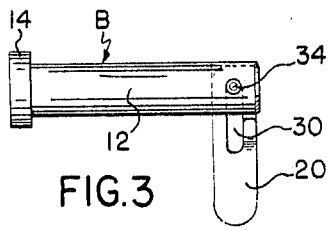
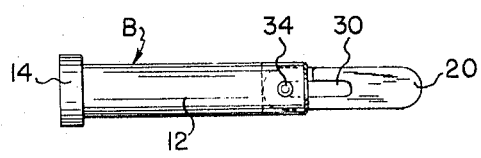
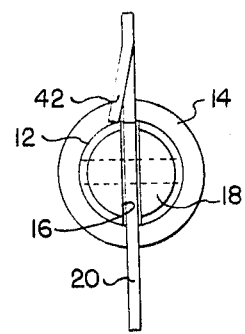
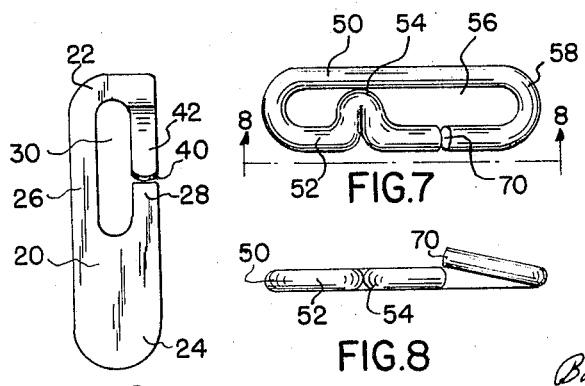
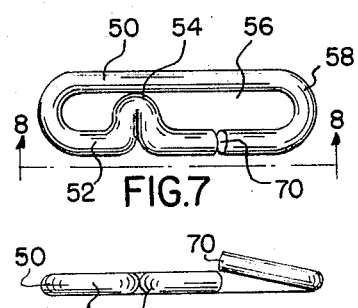
INVENTOR
FRANK C. COLLISTER
Baldwin, Egan, Walling & Fetzer
ATTORNEYS Nov. 4, 1969   F. C. COLLISTER   3,476,007
KEY BOLT
Filed Sept. 9, 1968   2 Sheets-Sheet 2

United States Patent Office 3,476,007
Patented Nov. 4, 1969

3,476,007
KEY BOLT
Frank C. Collister, 28382 N. Park Drive,
North Olmsted, Ohio 44070
Filed Sept. 9, 1968, Ser. No. 758,368
Int. Cl. F16b 21/00
U.S. Cl. 85—3   13 Claims

ABSTRACT OF THE DISCLOSURE

A key bolt including a shank having an open transversely disposed bolt slot at one end with an elongated planar key slidably disposed in the bolt slot. The key has end portions and spaced side walls forming a closed elongated key slot disposed intermediate the ends of the key. A pin is transversely disposed in the bolt shank and passes through the bolt slot and through the key slot at substantially right angles thereto to slidably retain the key within the bolt slot. The key is slidable in the bolt slot to an unlocked position wherein the key extends directly outwardly of the shank and forms an extension thereof and is slidable to a locked position wherein the key is substantially perpendicular to the shank. In one form of the invention, at least a portion of one of the side walls of the key is severed or partially severed or slotted intermediate the ends thereof with one severed portion having its free end portion offset from and protruding out of the plane of the key to form a key lock abutting the bolt shank to retain the key in locked position. Such severed portion is yieldable to a position within the plane of the key to enable the key to be moved from locked position to unlocked position.

---

This invention relates to key bolts and more particularly to such bolts having a key with locking means thereon.

In applications requiring the use of key bolts, it is highly essential that the pins be securely locked against accidental or inadvertent removal or displacement, yet be readily removable when desired. Prior pins fail to provide a positive, infallible locking means for releasably retaining the pin in such locked position.

Therefore, it is an object of the invention to provide a key bolt or clevis pin having a releasable locking means thereon that unfailingly retains the pin in locked position.

A further object of the invention is to provide a clevis pin of the above type that is simple in construction, inexpensive to manufacture, and highly effective in operation.

A further object of the invention is to enable locking, unlocking and removal from and insertion of the pin, bolt, rod etc., in an aperture without assembling or disassembling the locking key from the pin bolt rod etc., and without the use of tools.

Briefly the foregoing objects are accomplished by the provision of a key bolt including a shank having a bolt head at one end thereof. The shank has an open, transversely-disposed bolt slot at its other end to form a bifurcated end thereat. An elongated planar key is slidably disposed in the bolt slot and has end portions and spaced side walls forming a closed elongated key slot intermediate the ends of the key. A pin is transversely disposed in the shank at the bifurcated end and passes through the bolt slot and the key slot at substantially right angles thereto to slidably retain the key within the bolt slot. The key is slidable in the bolt slot to an unlocked position wherein the key extends directly outwardly of the shank and forms an extension thereof and is slidable to a locked position wherein the key is substantially perpendicular to the shank. One of the side walls of the key has at least a portion thereof severed intermediate the ends of the key with the severed portion having its free end portion offset from and protruding out of the plane of the key to form an abutment or key lock which abuts the bolt shank adjacent its bifurcated end to retain the key in locked position. At least the portion forming the abutment is formed of partially resilient material and thus such abutment is yieldable to a position within the plane of the key to enable the key to be moved from locked position to unlocked position.

In a modification of the invention, the key is formed of spring wire and one of the side walls has a protuberance extending inwardly of the key and in the plane thereof with the key slot being bounded at one end by the end portion of the key and at the other end by the protuberance.

In other modifications of the invention, to add strength in heavy duty applications and not loose ease and efficiency of operation, a key made of thin resilient material may be embossed, formed, or shaped of a thick material, too thick for the severed portion to be yieldable. In such instance, the key may have the offset protruding portion made of a thin resilient material affixed to it by any suitable means, such as welding, clipping rivets, bolts, screws, etc.

Thus there is provided a key bolt having a key with a positive lock means that retains the bolt in locked position under all conditions of use. One of the main advantages of the key and bolt or pin of the invention is they do not have to be disassembled to remove or replace the pins. This eliminates the problem of lost cotter keys, jessus clips etc. It also eliminates the need for purchasing, storing or assembling more than one part such as is the case with clevis pins and cotter keys.

Other objects and advantages of the invention will be apparent from the following description taken in conjunction with the drawings wherein:

FIG. 1 is a perspective view of a key bolt constructed in accordance with the invention;

FIG. 2 is a side elevational view of the key bolt shown in FIG. 1, and showing the key in locked position;

FIG. 3 is a view similar to FIG. 2, but showing an intermediate step in removing the key from locked position;

FIG. 4 is a view similar to FIG. 2, but showing the pin in unlocked position;

FIG. 5 is a view taken along the line 5—5 of FIG. 2;

FIG. 6 is a side elevational view of the bolt key shown in FIG. 1;

FIG. 7 is a side elevational view of a modified bolt key; and

FIG. 8 is a view taken along the line 8—8 of FIG. 7;

Figure 9:
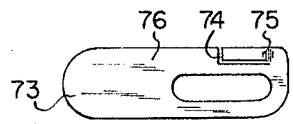
FIGS. 9 through 29 illustrate further modifications of the key of the invention.

Although the invention is shown and described herein with respect to key bolts or clevis pins, it will be understood that it may be employed on any type of bolt, yoke pin, clevis pin, draw bar pin, connecting rod, linkage, or elongated shank that must be locked in an aperture.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

Referring first to FIGS. 1 through 6, there is shown a key bolt B constructed in accordance with the invention and including a shank 12 having a bolt head 14 at one end thereof. The shank 12 has an open, transversely-disposed bolt slot 16 at its other end to form a bifurcated end 18 thereat. An elongated planar key 20 is slidably disposed in the bolt slot 16 and has end portions 22, 24 (FIG. 6) and spaced side walls 26, 28 forming a closed elongated key slot 30 intermediate the ends 22, 24 thereof. A pin 34 is transversely disposed in the shank 12 at its bifurcated end 18 and passes through the bolt slot 16 and said key slot 30 at substantially right angles thereto to slidably retain the key 20 within the bolt slot. The key 20 is slidable in the bolt slot 16 to an unlocked position wherein the key extends directly outwardly of the shank and forms an extension thereof as shown in FIG. 4 in which position the bolt may be inserted or removed from an aperture, and is slidable to a locked position wherein the key is substantially perpendicular to the shank as shown in FIG. 2. FIG. 3 shows the key in an intermediate position between locked and unlocked positions.

One of side walls 28 (FIG. 6) of the key is severed as at 40 intermediate the ends 22, 24 thereof, with one severed portion of the wall having its free end portion offset from and protruding out of the plane of the key as best shown in FIG. 5 to form an abutment or key lock 42 abutting the bolt shank 12 adjacent its bifurcated end 18 to retain the key in locked position. The severed portion or lock 42 is yieldable to a position within the plane of the key 20 to enable the key to be moved from locked position to unlocked position, that is from the position shown in FIG. 2, thence to the position shown in FIG. 3, and thence to the position shown in FIG. 4 and back again, if desired.

Referring now to FIGS. 7 and 8 there is illustrated a modification of the invention wherein the key 50 is formed of spring wire, and one of the side walls 52 thereof has a protuberance 54 extending inwardly of the key and in the plane thereof. Here, the key slot 56 is bounded at one end by the end portion 58 of the key and at the other end by the protubrance 54. In this modification there is a free end portion or lock 70 similar in structure and function to the lock 42 aforedescribed.

Figure 10:
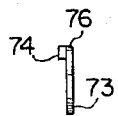
Figure 11:
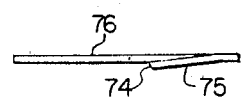

In the modification shown in FIGS. 9, 10 and 11, the key 73 has an abutment 74 formed by a (partially) severed portion 75 of at least a part of the side wall 76. The severed portion 75 is formed so that its free end portion 74 is offset from and protrudes out of the plane of the key 73 to form a key lock or abutment 74. The severed portion 75 is yieldable to a position within the plane of the key 73 to enable the removal of such key from locked to unlocked position, or vice versa, as aforedescribed.

Figure 12:
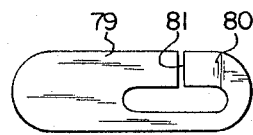
Figure 13:
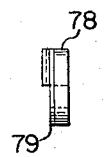
Figure 14:
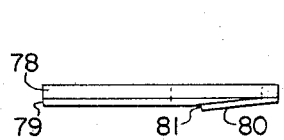

In the modification shown in FIGS. 12, 13 and 14, the key 78 is formed of substantially rigid material (for use in heavy-duty applications) and includes a flat resilient member 79 having a planar configuration substantially similar to that of the key 78. The member 79 may be secured to the key 78 by any suitable means, such as by welding, in juxtaposed relation to coincide with the key 78 and form a mirror image therewith, such member 79 having a severed portion 80 forming an abutment 81 of the invention.

Figure 15:
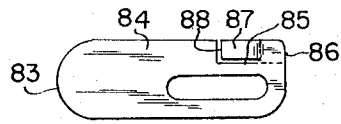
Figure 16:
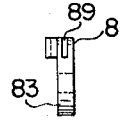
Figure 17:
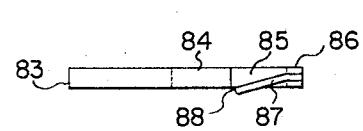

In the modification shown in FIGS. 15, 16 and 17, there is shown a key 83 of substantially rigid material and including a side wall 84 having an open-sided elongated recess 85 formed in the outer edge portion thereof. The recess 85 is bounded at one end by a projection 86 extending outwardly from the side wall 84. The projection has a groove 89 therein. An elongated resilient tab 87 is secured in the groove 89 of the projection 86 and extends into said recess and forms an abutment 88 of the invention, said tab 87 protruding out of the plane of the key 83 to form a key lock abutting the bolt shank to retain the key in locked position within the plane of the key to enable the key to be moved from locked position to unlocked position.

Figure 18:
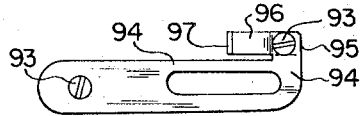
Figure 19:
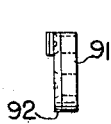
Figure 20:
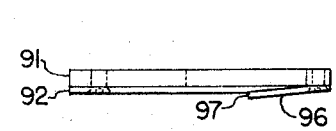

In the modification shown in FIGS. 18, 19 and 20, the key 91 is formed of rigid material and includes a flat resilient member 92 having a planar configuration similar to that of the key 91. The member 92 may be secured to the key 91 by any suitable means such as the screws 93, in juxtaposed relation. The side wall 94 has a projection 95 extending outwardly from such wall. The member 92 has an elongated resilient tab 96 extending out from the projection 95 and extends along the side wall 94 to form an abutment 97 of the invention. The tab 96 normally protrudes out of the plane of the key 91 and is yieldable to a position within the plane of the key. It will be noted that the projection 95 extends laterally out from the side wall 94 at one end of the key.

Figure 21:
Figure 22:
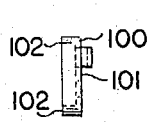
Figure 23:
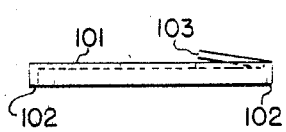
Figure 24:
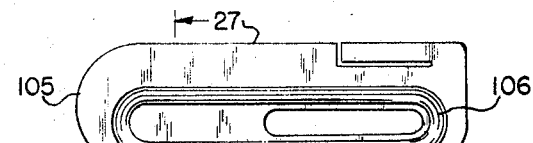
Figure 25:
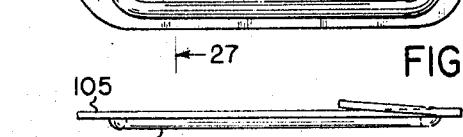

In the modification shown in FIGS. 21, 22 and 23, the outer peripheral edge 100 of the key 101 is formed into an outwardly extending endless flange 102 to strengthen the key, such key containing an abutment 103 of the invention.

In the modification shown in FIGS. 24, 25, 26 and 27, strengthening of the key 105 is effected by an elongated, annular, endless ridge 106 embossed lengthwise on the key.

Figure 28:
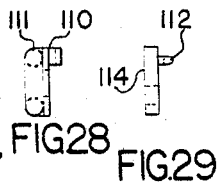

In the FIG. 28 modification, the key 110 has an elongated annular endless wire 111 secured lengthwise on the key to strengthen the same.

Figure 29:

In the FIG. 29 modification, the abutment 112 of the invention is formed of an elongated piece of wire secured to the key 114.

Figure 30:
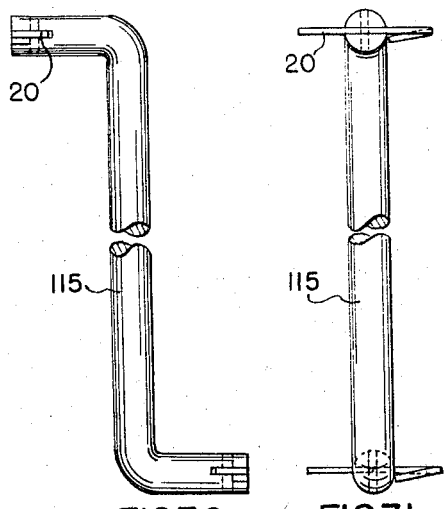
FIG. 30 is a side elevational view of a connecting rod embodying the invention.
Figure 31:
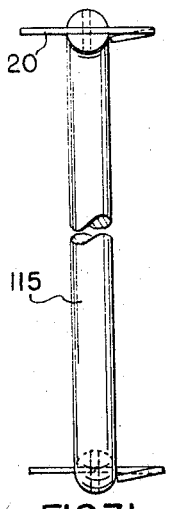
FIG. 31 is an end view of the connecting rod shown in FIG. 30.
Figure 26:
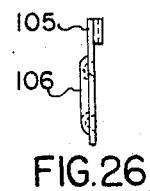
Figure 27:
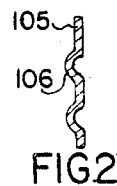

FIGURES 30 and 31 illustrate a key 20 of the invention applied to a connecting bar 115.

With the above-described structures, there is provided a key bolt having a positive locking means that unfailingly retains the bolt in locked position under all operating conditions. No tools are needed to lock or unlock or remove the pin. No assembly or disassembly is required such as with cotter keys, jessus clips, etc. The problem of looking on the floor for lost cotter pins and clips is eliminated. A single part is all that is to be purchased, stored and inventoried.

What is claimed is:

1. A key bolt including a shank having a bolt head at one end thereof, said shank having an open transversely disposed bolt slot at its other end to form a bifurcated end thereat; an elongated planar key slidably disposed in said bolt slot and having end portions and spaced side walls forming a closed elongated key slot intermediate the ends of the key; and a pin transversely disposed in the shank at said bifurcated end and passing through said bolt slot and said key slot at substantially right angles thereto to slidably retain the key within the bolt slot, said key being slidable in said bolt slot to an unlocked position wherein the key extends directly outwardly of the shank and forms an extension thereof and being slidable to a locked position wherein the key is substantially perpendicular to the shank, one of said side walls of the key including an abutment protruding out of the plane of the key to form a key lock abutting the bolt shank adjacent its bifurcated end to retain the key in locked position, said abutment being yieldable to a position within the plane of the key to enable the key to be moved from locked position to unlocked position.

2. The structure of claim 1 wherein said abutment is formed by a severed portion of at least a part of said one side wall whereby such severed portion has its free end portion offset from and protruding out of the plane of the key to form a key lock abutting the bolt shank adjacent its bifurcated end to retain the key in locked position, said severed portion being yieldable to a position within the plane of the key to enable the key to be moved from locked position to unlocked position.

3. The structure of claim 2 wherein said one side wall is completely severed to form said abutment.

4. The structure of claim 1 wherein the key is formed of spring wire, and one of the side walls has a protuberance extending inwardly of the key and in the plane thereof, said key slot being bounded at one end by the end portion of the key and at the other end by said protuberance.

5. The structure of claim 1 wherein said key is formed of substantially rigid material and includes a flat resilient member having a planar configuration substantially similar to that of the key, said member being secured to the key in juxtaposed relation to coincide with the key and form a mirror-image therewith, said member having a severed portion forming said abutment.

6. The structure of claim 1 wherein said one side wall has an open-sided elongated recess formed in the outer edge portion thereof, said recess being bounded at one end by a projection extending outwardly from said one side wall, and an elongated resilient tab is secured to the projection and extends into said recess and forms said abutment, said tab protruding out of the plane of the key to form a key lock abutting the bolt shank to retain the key in locked position and being yieldable to a position within the plane of the key to enable the key to be moved from locked position to unlocked position.

7. The structure of claim 6 wherein said projection has a groove formed therein and said tab is secured in said groove.

8. The structure of claim 5 wherein said one side wall has a projection extending outwardly from such wall, and said member has an elongated resilient tab extending out from said projection and extends along said one side wall to form said abutment, said tab normally protruding out of the plane of the key and being yieldable to a position within the plane of the key.

9. The structure of claim 8 wherein said projection extends laterally out from said one side wall at one end of the key.

10. The structure of claim 1 wherein an elongated, annular, endless ridge is embossed lengthwise on the key to strengthen the same.

11. The structure of claim 1 wherein the outer peripheral edge of the key is formed into an outwardly extending endless flange to strengthen the key.

12. The structure of claim 1 wherein said key has an elongated, annular endless wire secured lengthwise on the key to strengthen the same.

13. The structure of claim 1 wherein said abutment is formed of an elongated piece of wire secured to the key.

References Cited

UNITED STATES PATENTS

| | | | |
|---|---|---|---|
| 325,221 | 8/1885 | Wright | 85—3 |
| 581,693 | 5/1897 | Capen | 85—3 |
| 1,148,429 | 7/1915 | Beach | 85—3 |
| 1,409,626 | 3/1922 | Walther | 85—3 |

EDWARD C. ALLEN, Primary Examiner